United States Patent
Huang et al.

(10) Patent No.: US 12,424,923 B2
(45) Date of Patent: Sep. 23, 2025

(54) POWER CONVERTER HAVING HIGH-SIDE DRIVING MECHANISM CONSUMING LOW POWER

(71) Applicant: ANPEC ELECTRONICS CORPORATION, Hsinchu (TW)

(72) Inventors: Ping-Yu Huang, Hsinchu (TW); Tzu-Yang Yen, Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 360 days.

(21) Appl. No.: 18/297,637

(22) Filed: Apr. 9, 2023

(65) Prior Publication Data
US 2024/0162807 A1    May 16, 2024

(30) Foreign Application Priority Data
Nov. 10, 2022 (TW) .................................. 111142905

(51) Int. Cl.
*H02M 3/158* (2006.01)
*H02M 1/08* (2006.01)

(52) U.S. Cl.
CPC ............. *H02M 1/08* (2013.01); *H02M 3/158* (2013.01)

(58) Field of Classification Search
CPC ...... H02M 1/08; H02M 3/158; H02M 1/0006; H02M 1/0009; H02M 1/0041; H02M 1/0048
See application file for complete search history.

(56) References Cited

U.S. PATENT DOCUMENTS

| | | | |
|---|---|---|---|
| 2008/0100378 A1* | 5/2008 | Bernacchia | H02M 7/5388 327/589 |
| 2017/0302178 A1* | 10/2017 | Bandyopadhyay | H02M 1/08 |
| 2025/0149990 A1* | 5/2025 | Adragna | H02M 3/3353 |

FOREIGN PATENT DOCUMENTS

CN      113541453 A     10/2021

* cited by examiner

*Primary Examiner* — Kyle J Moody
(74) *Attorney, Agent, or Firm* — Li & Cai Intellectual Property Office

(57) ABSTRACT

A power converter having a high-side driving mechanism consuming low power is provided. A first terminal of a high-side switch is coupled to an input voltage. A second terminal of the high-side switch is connected to a first terminal of a low-side switch. A second terminal of the low-side switch is grounded. A first terminal of a bootstrap capacitor is connected to a node between the second terminal of the high-side switch and the first terminal of the low-side switch. A second terminal of the bootstrap capacitor is connected to a charging circuit. The charging circuit charges the bootstrap capacitor and detects data of the bootstrap capacitor. The charging circuit, according to the detected data of the bootstrap capacitor, determines whether or not to stop charging the bootstrap capacitor or to adjust charging of the bootstrap capacitor.

18 Claims, 6 Drawing Sheets

POWER CONVERTER HAVING HIGH-SIDE DRIVING MECHANISM CONSUMING LOW POWER

CROSS-REFERENCE TO RELATED PATENT APPLICATION

This application claims the benefit of priority to Taiwan Patent Application No. 111142905, filed on Nov. 10, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to a power converter having a high-side driving mechanism consuming low power.

BACKGROUND OF THE DISCLOSURE

Power converters are indispensable for electronic devices. The power converters are used for adjusting power and supplying the adjusted power to the electronic devices. High-side switches and low-side switches of the power converters must be switched according to data such as those pertaining to voltages and currents of circuit components of the power converters, so that the power converters can supply appropriate power to the electronic devices connected to output terminals of the power converters. However, conventional driver circuits cannot precisely switch the high-side switches and the low-side switches of the power converters. As a result, the power converters are unable to effectively supply the appropriate power to the electronic devices.

SUMMARY OF THE DISCLOSURE

In response to the above-referenced technical inadequacies, the present disclosure provides a power converter having a high-side driving mechanism consuming low power. The power converter includes a high-side switch, a low-side switch, a control circuit, a bootstrap circuit and a charging circuit. A first terminal of the high-side switch is coupled to an input voltage. A first terminal of the low-side switch is connected to a second terminal of the high-side switch. A second terminal of the low-side switch is grounded. A control circuit is connected to a control terminal of the high-side switch and a control terminal of the low-side switch. The control circuit is configured to control the high-side switch and the low-side switch to operate. The bootstrap circuit includes a bootstrap capacitor. A first terminal of the bootstrap capacitor is connected to a node between the first terminal of the low-side switch and the second terminal of the high-side switch. The charging circuit is connected to a second terminal of the bootstrap capacitor. The charging circuit charges the bootstrap capacitor. The charging circuit detects data of the bootstrap capacitor to determine whether or not the charging circuit stops charging the bootstrap capacitor or adjusts charging of the bootstrap capacitor.

In certain embodiments, the charging circuit detects the bootstrap capacitor within a detection time included in a working period of each of the pulse waves of a clock signal, but the charging circuit does not detect the bootstrap capacitor within other time periods of each of the pulse waves of the clock signal.

In certain embodiments, when the charging circuit determines that a voltage of the bootstrap capacitor is higher than a reference voltage, the charging circuit stops charging the bootstrap capacitor.

In certain embodiments, the charging circuit charges the bootstrap capacitor within working periods of pulse waves of a clock signal, but the charging circuit does not charge the bootstrap capacitor within non-working periods of the pulse waves of the clock signal.

In certain embodiments, when the charging circuit determines that a current time falls within a working period of a pulse wave of a clock signal and a voltage of the bootstrap capacitor is lower than a reference voltage, the charging circuit charges the bootstrap capacitor.

In certain embodiments, when the charging circuit determines that the current time falls within the working period of the pulse wave of the clock signal and the voltage of the bootstrap capacitor is higher than the reference voltage, the charging circuit stops charging the bootstrap capacitor.

In certain embodiments, when the charging circuit determines that the current time does not fall within the working period of the pulse wave of the clock signal, the charging circuit does not detect and charge the bootstrap capacitor.

In certain embodiments, the control circuit turns on the high-side switch within a working period of a waveform of a high-side conduction time signal, but the control circuit turns off the high-side switch within a non-working period of the waveform of the high-side conduction time signal.

In certain embodiments, when a frequency of the high-side conduction time signal is larger than a frequency of a clock signal, the charging circuit determines a frequency that the charging circuit charges the bootstrap capacitor according to the frequency of the high-side conduction time signal.

In certain embodiments, when the frequency of the high-side conduction time signal is smaller than the frequency of the clock signal, the charging circuit determines the frequency that the charging circuit charges the bootstrap capacitor according to the frequency of the clock signal.

In certain embodiments, when the working period of the waveform of the high-side conduction time signal is smaller than a working period of a pulse wave of a clock signal, the charging circuit determines time within which the charging circuit charges the bootstrap capacitor according to the working period of the waveform of the high-side conduction time signal.

In certain embodiments, when the working period of the waveform of the high-side conduction time signal is larger than a working period of the pulse wave of the clock signal, the charging circuit determines the time within which the charging circuit charges the bootstrap capacitor according to the working period of the waveform of the clock signal.

In certain embodiments, when a current flowing through the high-side switch reaches a zero value, the charging circuit determines the time within which the bootstrap capacitor is detected and a frequency that the bootstrap capacitor is detected according to working periods of pulse waves of a clock signal.

In certain embodiments, when a current flowing through the high-side switch reaches a zero value, the charging circuit determines the time within which the bootstrap capacitor is charged and a frequency that the bootstrap capacitor is charged according to a clock signal and a voltage of the bootstrap capacitor being detected by the charging circuit.

In certain embodiments, the power converter further includes a first inverter. An input terminal of the first inverter is connected to an output terminal of the control circuit. An output terminal of the first inverter is connected to the control terminal of the high-side switch.

In certain embodiments, a power terminal of the first inverter is connected to the charging circuit.

In certain embodiments, the power converter further includes a second inverter. An input terminal of the second inverter is connected to the output terminal of the control circuit. An output terminal of the second inverter is connected to the control terminal of the low-side switch.

As described above, the present disclosure provides the power converter having the high-side driving mechanism consuming the low power. The charging circuit of the power converter of the present disclosure charges the bootstrap capacitor, and detects the data such as the voltage of the bootstrap capacitor. The charging circuit, according the detected data, determines whether or not the charging of the bootstrap capacitor is adjusted to charge the voltage of the bootstrap capacitor to reach the reference voltage. When the voltage of the bootstrap capacitor reaches the reference voltage, the high-side switch can be successfully turned on or off. At this time, the charging circuit stops charging the bootstrap capacitor, thereby reducing the power consumption of the power converter of the present disclosure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
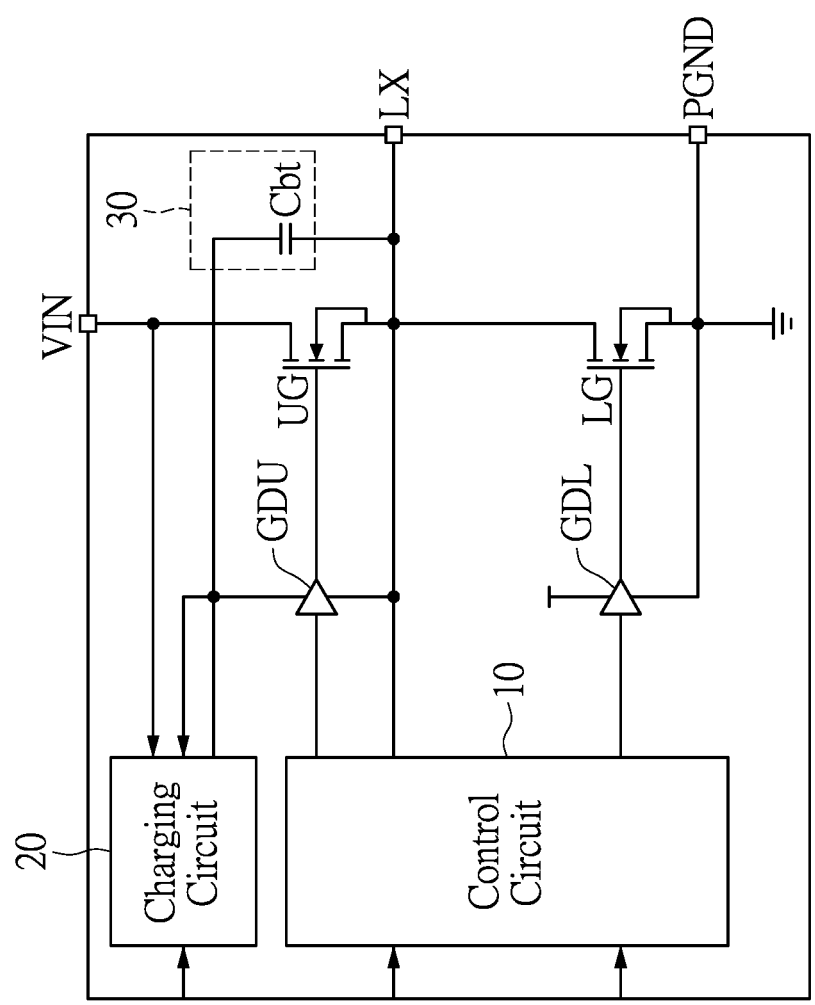
FIG. 1 is a block diagram of a power converter having a high-side driving mechanism consuming low power according to first to fifth embodiments of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a block diagram of a power converter having a high-side driving mechanism consuming low power according to first to fifth embodiments of the present disclosure.

As shown in FIG. 1, the power converter of the present disclosure may include a high-side switch UG, a low-side switch LG, a control circuit 10, a charging circuit 20 and a bootstrap circuit 30.

A first terminal of the high-side switch UG is coupled to an input voltage VIN. A first terminal of the low-side switch LG is connected to a second terminal of the high-side switch UG. A second terminal of the low-side switch LG is grounded.

The bootstrap circuit 30 may include a bootstrap capacitor Cbt, but the present disclosure is not limited thereto. A first terminal of the bootstrap capacitor Cbt may be connected to (a node LX between the first terminal of the low-side switch LG and) the second terminal of the high-side switch UG. A second terminal of the bootstrap capacitor Cbt may be connected to the charging circuit 20. For example, the charging circuit 20 described herein may include a charge pump, but the present disclosure is not limited thereto.

The control circuit 10 may be connected to a control terminal of the high-side switch UG and a control terminal of the low-side switch LG. The control circuit 10 may control the high-side switch UG and the low-side switch LG to operate.

If necessary, the power converter of the present disclosure may further include a first inverter GDU, a second inverter GDL or a combination thereof as shown in FIG. 1.

An input terminal of the first inverter GDU may be connected to an output terminal of the control circuit 10. An output terminal of the first inverter GDU may be connected to the control terminal of the high-side switch UG. A positive power terminal of the first inverter GDU may be connected to the charging circuit 20. A negative power terminal of the first inverter GDU may be connected to the output terminal of the control circuit 10 or the second terminal of the high-side switch UG.

An input terminal of the second inverter GDL may be connected to the output terminal of the control circuit 10. An output terminal of the second inverter GDL may be connected to the control terminal of the low-side switch LG. A positive power terminal of the second inverter GDL may be connected to the charging circuit 20 or other input power sources. A negative power terminal of the second inverter GDL and a pin PGND of the power converter may be grounded.

It is worth noting that, when the control circuit 10 turns on the high-side switch UG and turns off the low-side switch LG, the charging circuit 20 may charge the bootstrap capacitor Cbt such that a voltage of the bootstrap capacitor Cbt reaches a reference voltage. The charging circuit 20 may detect the voltage of the bootstrap capacitor Cbt, a current flowing through the bootstrap capacitor Cbt and other data to determine whether or not the charging circuit 20 stops charging the bootstrap capacitor Cbt or adjusts the charging of the bootstrap capacitor Cbt.

The charging circuit 20 of the power converter of the present disclosure charges the bootstrap capacitor Cbt to adjust an operational state of the high-side switch UG such that the high-side switch UG can be turned on or off normally. When the bootstrap capacitor Cbt is charged to reach the reference voltage, the charging circuit 20 stops charging the bootstrap capacitor Cbt, thereby reducing power consumption of the power converter.

Figure 2:
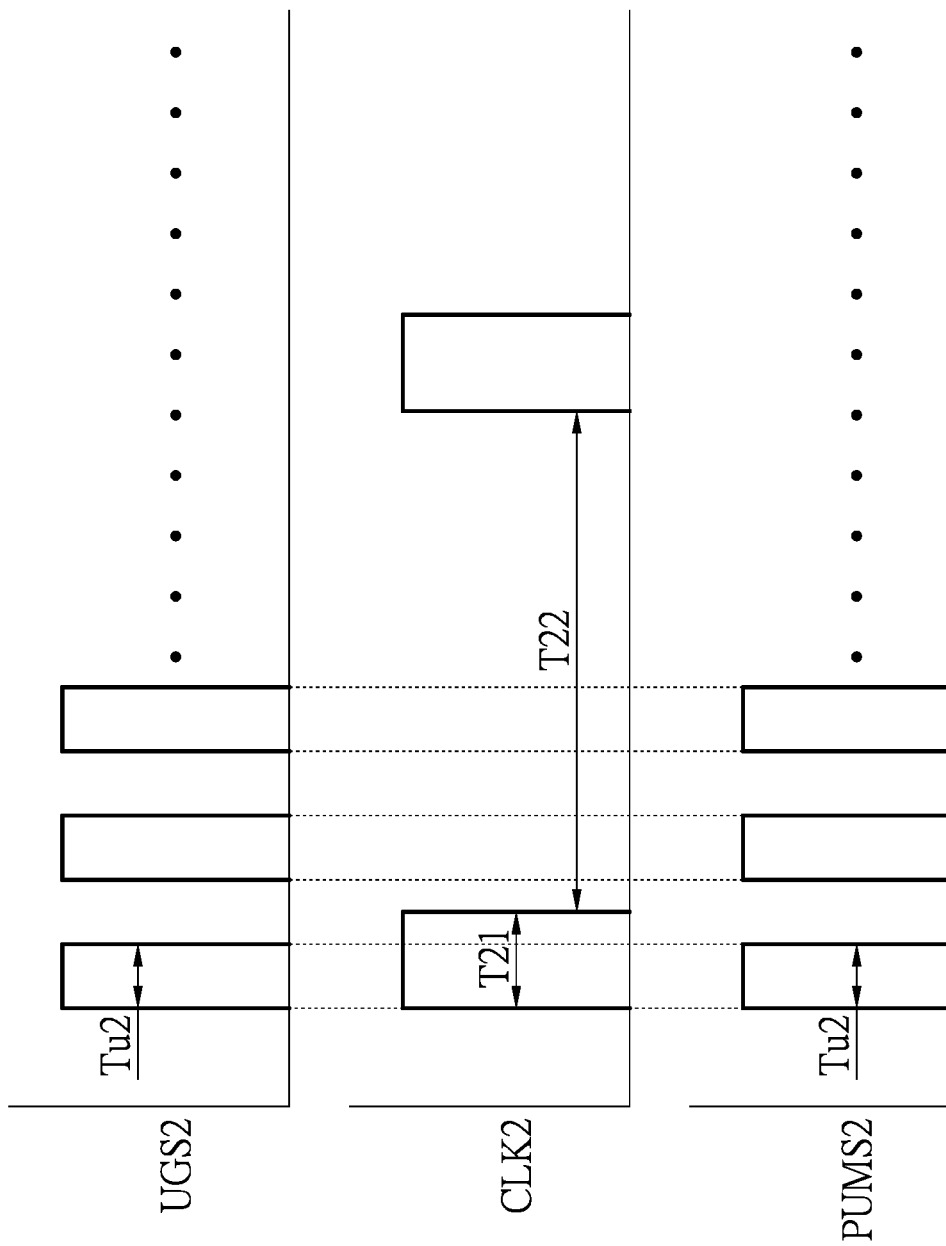
FIG. 2 is a waveform diagram of signals of the power converter having the high-side driving mechanism consuming the low power according to the first embodiment of the present disclosure.

Reference is made to FIGS. 1 and 2, in which FIG. 1 is a block diagram of a power converter having a high-side driving mechanism consuming low power according to first to fifth embodiments of the present disclosure, and FIG. 2 is a waveform diagram of signals of the power converter having the high-side driving mechanism consuming the low power according to the first embodiment of the present disclosure.

The control circuit 10 may turn on the high-side switch UG within a working period Tu2 (such as, but not limited to, 70%) of each of a plurality of waveforms of a high-side conduction time signal UGS2 as shown in FIG. 2. The control circuit 10 may turn off the high-side switch UG within a non-working period of each of the plurality of waveforms of the high-side conduction time signal UGS2. The high-side conduction time signal UGS2 described herein may be a signal that is directly outputted from the control circuit 10 to the high-side switch UG. Alternatively, the control circuit 10 outputs a signal, and then the signal is inverted to form the high-side conduction time signal UGS2 outputted to the high-side switch UG by the first inverter GDU.

In the embodiment, the high-side switch UG is switched between an open state and a closed state according to levels of the high-side conduction time signal UGS2.

Therefore, in the embodiment, the charging circuit 20 may, according to the high-side conduction time signal UGS2 and a clock signal CLK2 as shown in FIG. 2, determine time within which the bootstrap capacitor Cbt is charged and a frequency that the bootstrap capacitor Cbt is charged. A working period T21 and a non-working period T22 of each of a plurality of pulse waves of the clock signal CLK2 may depend on charging capability of the charging circuit 20, a capacitance of the bootstrap capacitor Cbt, and other data.

As shown in FIG. 2, when a frequency of the high-side conduction time signal UGS2 is larger than a frequency of the clock signal CLK2, a frequency of an enable signal PUMS2 of the charging circuit 20 is equal to the frequency of the high-side conduction time signal UGS2. The charging circuit 20 determines the frequency that the charging circuit 20 charges the bootstrap capacitor Cbt according to the frequency of the enable signal PUMS2.

That is, when the frequency of the high-side conduction time signal UGS2 is larger than the frequency of the clock signal CLK2, the charging circuit 20 determines the frequency that the charging circuit 20 charges the bootstrap capacitor Cbt according to the frequency of the high-side conduction time signal UGS2.

In practice, when the frequency of the high-side conduction time signal UGS2 is smaller than the frequency of the clock signal CLK2, the charging circuit 20 determines the frequency that the charging circuit 20 charges the bootstrap capacitor Cbt according to the frequency of the clock signal CLK2.

As shown in FIG. 2, when the working period Tu2 of the waveform of the high-side conduction time signal UGS2 is smaller than the working period T21 of the pulse wave of the clock signal CLK2, the working period Tu2 of a waveform of the enable signal PUMS2 of the charging circuit 20 is equal to the working period Tu2 of the waveform of the high-side conduction time signal UGS2. Under this condition, the charging circuit 20 determines time within which the charging circuit 20 charges the bootstrap capacitor Cbt according to the working period Tu2 of the waveform of the enable signal PUMS2.

That is, when the working period Tu2 of the waveform of the high-side conduction time signal UGS2 is smaller than the working period T21 of the pulse wave of the clock signal CLK2, the charging circuit 20 determines the time within which the charging circuit 20 charges the bootstrap capacitor Cbt according to the working period Tu2 of the waveform of the high-side conduction time signal UGS2.

When the enable signal PUMS2 is at a high level (within the working period Tu2 of the waveform of the enable signal PUMS2), the charging circuit 20 charges the bootstrap capacitor Cbt. When the enable signal PUMS2 is at a low level (within a non-working period of the waveform of the enable signal PUMS2), the charging circuit 20 does not charge the bootstrap capacitor Cbt. As a result, the high-side switch UG of the power converter of the present disclosure can be turned on or off normally while the power consumption of the power converter is reduced.

Figure 3:
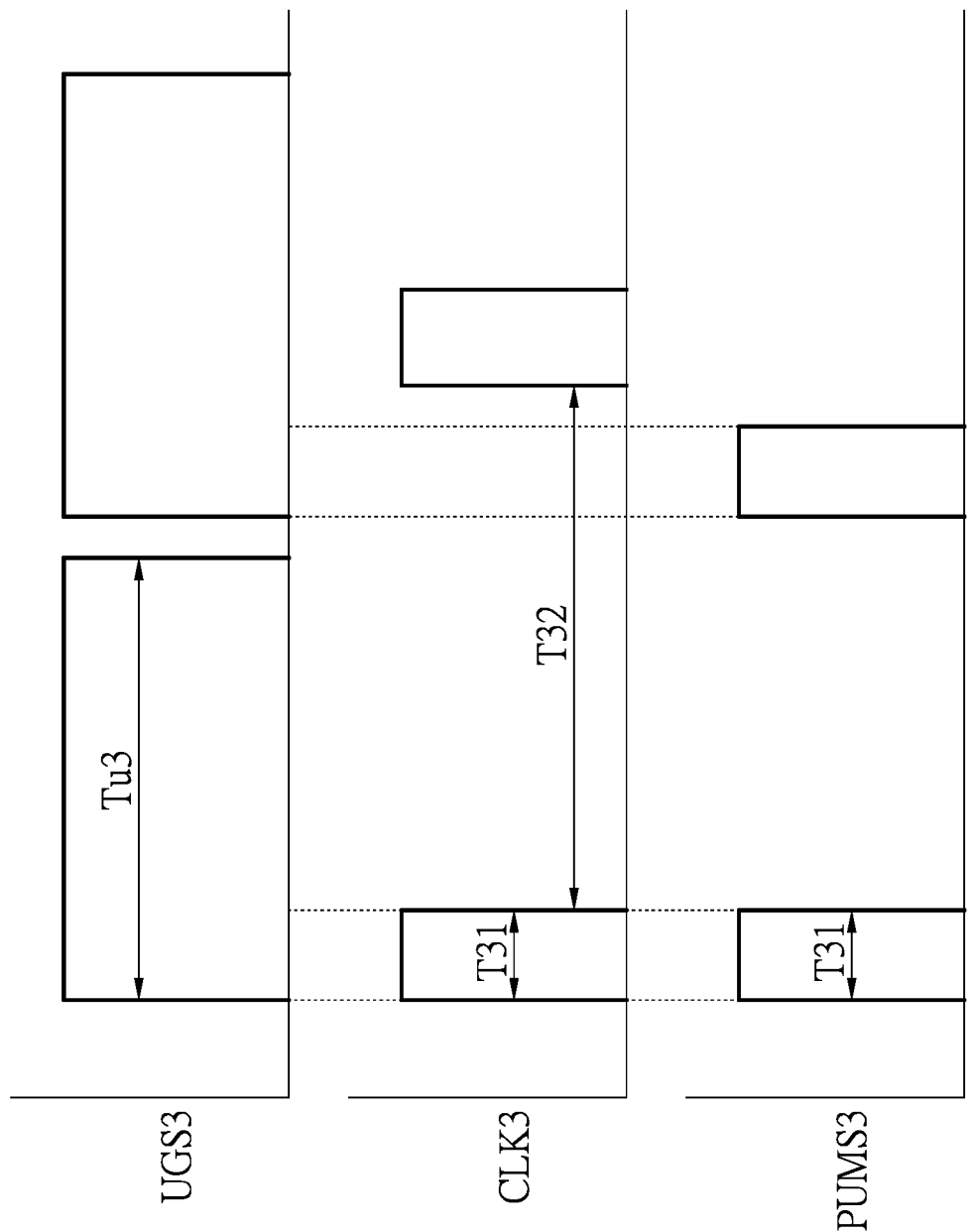
FIG. 3 is a waveform diagram of signals of the power converter having the high-side driving mechanism consuming the low power according to the second embodiment of the present disclosure.

Reference is made to FIGS. 1 and 3, in which FIG. 1 is a block diagram of a power converter having a high-side driving mechanism consuming low power according to first to fifth embodiments of the present disclosure, and FIG. 3 is a waveform diagram of signals of the power converter having the high-side driving mechanism consuming the low power according to the second embodiment of the present disclosure.

The control circuit 10 may turn on the high-side switch UG within a working period Tu3 (such as, but not limited to, 90%) of each of a plurality of waveforms of a high-side conduction time signal UGS3 as shown in FIG. 3. The control circuit 10 may turn off the high-side switch UG within a non-working period of each of the plurality of waveforms of the high-side conduction time signal UGS3. The high-side conduction time signal UGS3 may be a signal that is directly outputted from the control circuit 10 to the high-side switch UG. Alternatively, the control circuit 10 outputs a signal, and then the signal is inverted to form the high-side conduction time signal UGS3 outputted to the high-side switch UG by the first inverter GDU.

In the embodiment, the high-side switch UG is switched between the open state and the closed state according to levels of the high-side conduction time signal UGS3.

Therefore, in the embodiment, the charging circuit 20 may, according to the high-side conduction time signal UGS3 and a clock signal CLK3 as shown in FIG. 3, determine the time within which the bootstrap capacitor Cbt is charged and the frequency that the bootstrap capacitor Cbt is charged. A working period T31 and a non-working period T32 of the clock signal CLK3 may depend on the charging capability of the charging circuit 20, the capacitance of the bootstrap capacitor Cbt and other data.

As shown in FIG. 3, when a frequency of the high-side conduction time signal UGS3 is larger than a frequency of the clock signal CLK3, a frequency of an enable signal PUMS3 of the charging circuit 20 is equal to the frequency of the high-side conduction time signal UGS3. The charging circuit 20 determines the frequency that the charging circuit 20 charges the bootstrap capacitor Cbt according to the frequency of the enable signal PUMS3.

That is, when the frequency of the high-side conduction time signal UGS3 is larger than the frequency of the clock signal CLK3, the charging circuit 20 determines the frequency that the charging circuit 20 charges the bootstrap capacitor Cbt according to the frequency of the high-side conduction time signal UGS3.

As shown in FIG. 3, when the working period Tu3 of the waveform of the high-side conduction time signal UGS3 is larger than the working period T31 of a pulse wave of the clock signal CLK3, the working period T31 of a waveform of the enable signal PUMS3 of the charging circuit 20 is equal to the working period T31 of the pulse wave of the clock signal CLK3. Under this condition, the charging circuit 20 determines the time within which the charging circuit 20 charges the bootstrap capacitor Cbt according to the working period T31 of the waveform of the enable signal PUMS3.

That is, when the working period Tu3 of the waveform of the high-side conduction time signal UGS3 is larger than the working period T31 of the pulse wave of the clock signal CLK3, the charging circuit 20 determines the time within which the charging circuit 20 charges the bootstrap capacitor Cbt according to the working period T31 of the pulse wave of the clock signal CLK3.

When the enable signal PUMS3 is at a high level (within the working period T31 of the waveform of the enable signal PUMS2), the charging circuit 20 charges the bootstrap capacitor Cbt. When the enable signal PUMS3 is at a low level (within a non-working period of the waveform of the enable signal PUMS3), the charging circuit 20 does not charge the bootstrap capacitor Cbt. As a result, the high-side switch UG of the power converter of the present disclosure can be turned on or off normally, while the power consumption of the power converter is reduced.

Figure 4:
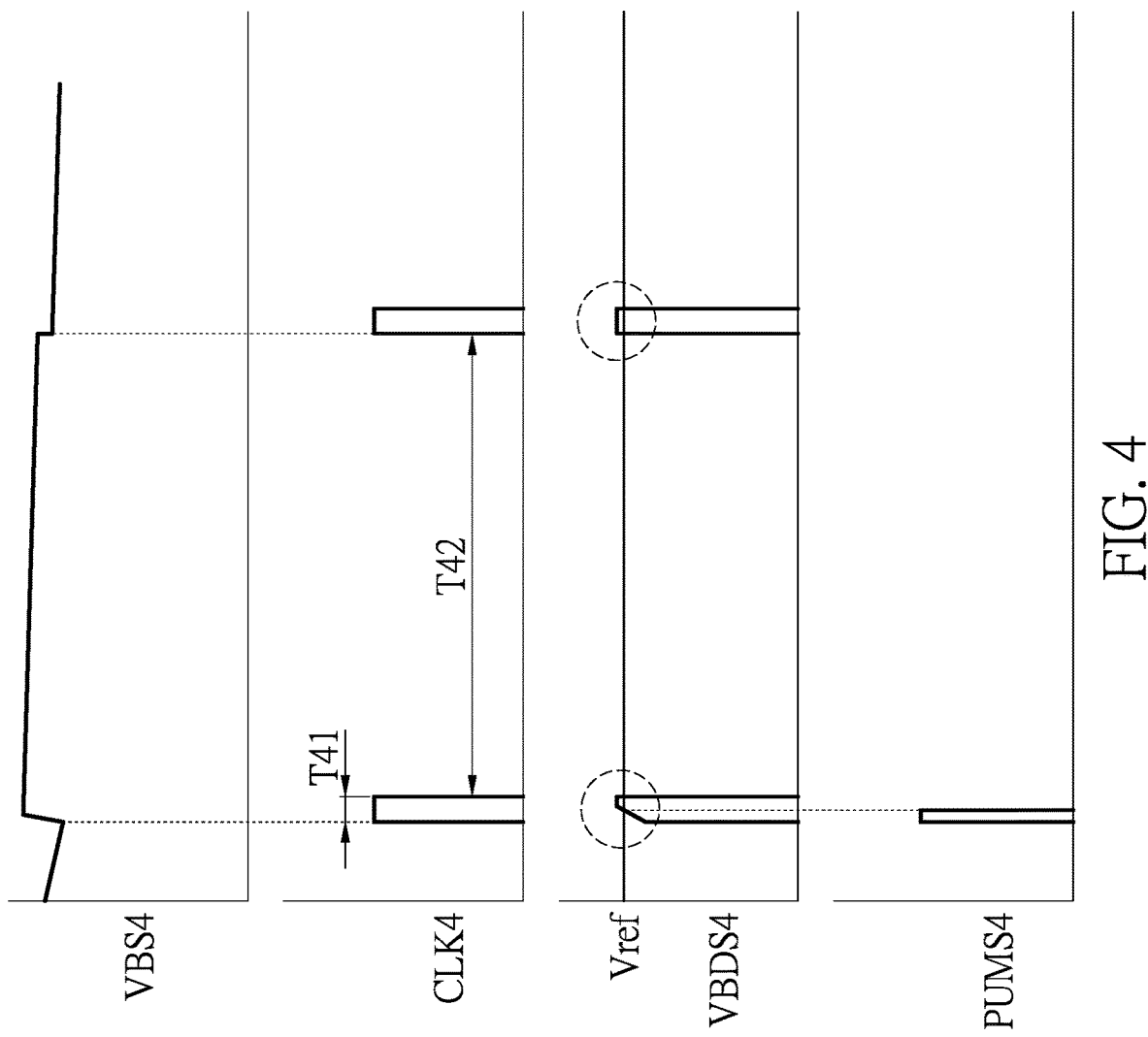
FIG. 4 is a waveform diagram of signals of the power converter having the high-side driving mechanism consuming the low power according to the third embodiment of the present disclosure.

Reference is made to FIGS. 1 and 4, in which FIG. 1 is a block diagram of a power converter having a high-side driving mechanism consuming low power according to first to fifth embodiments of the present disclosure, and FIG. 4 is a waveform diagram of signals of the power converter having the high-side driving mechanism consuming the low power according to the third embodiment of the present disclosure.

A capacitor voltage signal VBS4 shown in FIG. 4 is a voltage signal of the bootstrap capacitor Cbt. As shown in FIG. 4, when the high-side switch UG is switched from the closed state to the open state, a voltage of the bootstrap capacitor Cbt drops.

A charging current that is provided to the bootstrap capacitor Cbt from the bootstrap capacitor Cbt, the time within which the bootstrap capacitor Cbt is charged, the frequency that the bootstrap capacitor Cbt is charged or the voltage of the bootstrap capacitor Cbt may be larger than an appropriate value threshold. As a result, a voltage of the high-side switch UG may be higher than a withstand voltage of the high-side switch UG.

In order to successfully turn on or off the high-side switch UG and prevent the high-side switch UG and other circuit components from being damaged due to overvoltage, the charging circuit 20 detects the voltage of the bootstrap capacitor Cbt. For example, in the embodiment, when a current flowing through the high-side switch UG reaches a zero value, the charging circuit 20 detects the voltage of the bootstrap capacitor Cbt.

When the current flowing through the high-side switch UG is the zero value, the charging circuit 20 determines time within which the bootstrap capacitor Cbt is detected and a frequency that the bootstrap capacitor Cbt is detected according to a clock signal CLK4.

The charging circuit 20 detects the voltage of the bootstrap capacitor Cbt to generate a capacitor voltage detected signal VBDS4 within a detection time included in a working period T41 of the clock signal CLK4 as shown in FIG. 4. The detection time is equal to or shorter than the working period T41 of the clock signal CLK4.

However, the charging circuit 20 does not detect and charge the bootstrap capacitor Cbt within a non-working period T42 of the clock signal CLK4 and other times, thereby reducing the power consumption of the power converter of the present disclosure.

When the current flowing through the high-side switch UG is the zero value, the charging circuit 20 may adjust the time within which the bootstrap capacitor Cbt is charged and the frequency that the bootstrap capacitor Cbt is charged according to the clock signal CLK4 and the detected voltage of the bootstrap capacitor Cbt (such as a voltage of the capacitor voltage detected signal VBDS4 as shown in FIG. 4).

For example, when the charging circuit 20 determines that the current time falls within the working period T41 of the clock signal CLK4 and the voltage of the bootstrap capacitor Cbt is lower than a reference voltage Vref, an enable signal PUMS4 of the charging circuit 20 is at a high level. When the enable signal PUMS4 is at the high level (within the working period T41 of a waveform of the enable signal PUMS4), the charging circuit 20 charges the bootstrap capacitor Cbt. The reference voltage Vref depends on the withstand voltage of the high-side switch UG.

For example, when the charging circuit 20 determines that the current time falls within the working period T41 of the clock signal CLK4 and the voltage of the bootstrap capacitor Cbt is higher than the reference voltage Vref, the enable signal PUMS4 transits from the high level to a low level. When the enable signal PUMS4 is at the low level (within a non-working period of the waveform of the enable signal PUMS4), the charging circuit 20 stops charging the bootstrap capacitor Cbt.

The enable signal PUMS4 is maintained at the low level during the non-working period T42 of the clock signal CLK4. When the enable signal PUMS4 is at the low level (within the non-working period of the waveform of the enable signal PUMS4), the charging circuit 20 does not charge the bootstrap capacitor Cbt.

Figure 5:
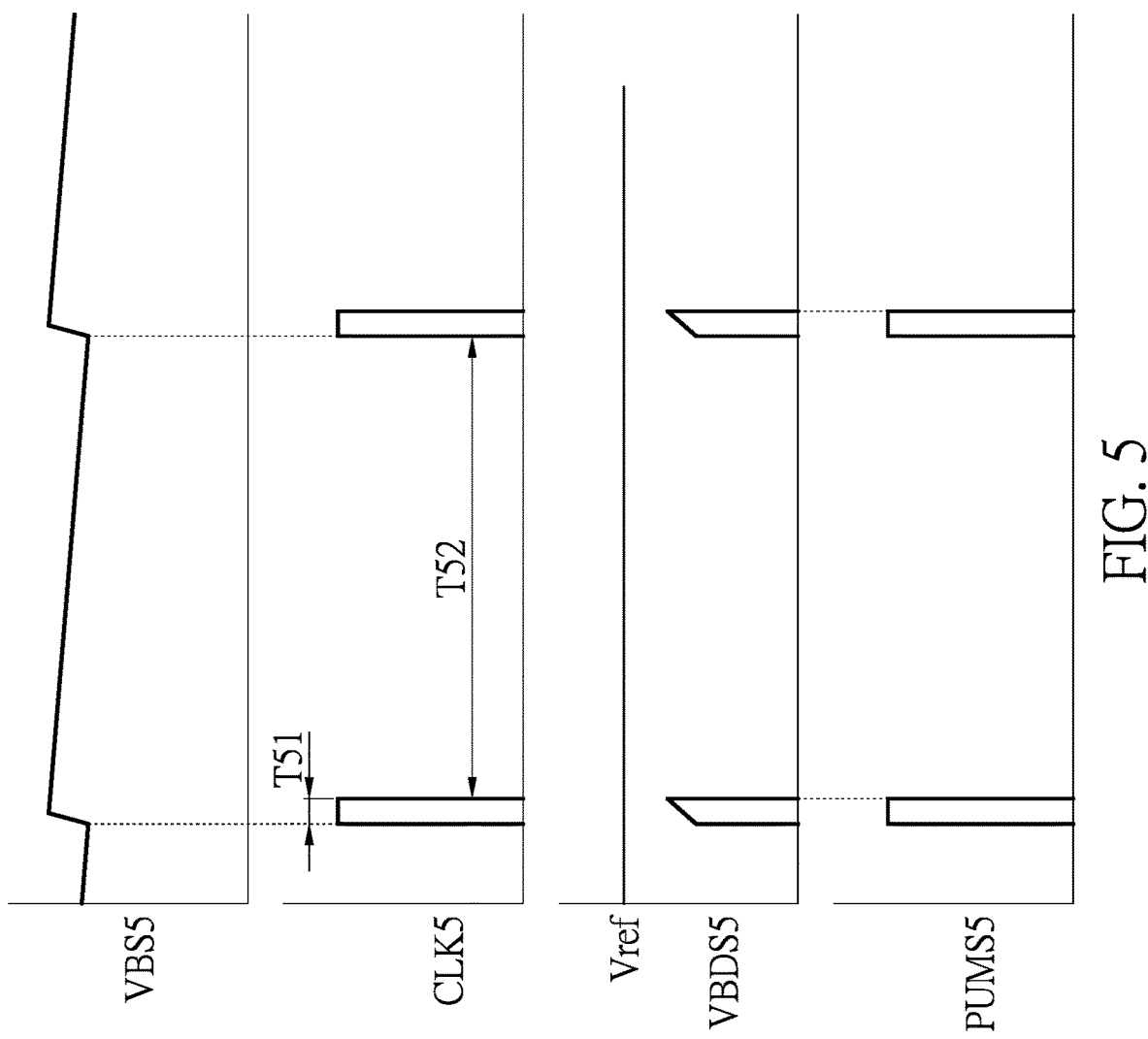
FIG. 5 is a waveform diagram of signals of the power converter having the high-side driving mechanism consuming the low power according to the fourth embodiment of the present disclosure.

Reference is made to FIGS. 1 and 5, in which FIG. 1 is a block diagram of a power converter having a high-side driving mechanism consuming low power according to first to fifth embodiments of the present disclosure, and FIG. 5 is a waveform diagram of signals of the power converter having the high-side driving mechanism consuming the low power according to the fourth embodiment of the present disclosure.

A capacitor voltage signal VBS5 shown in FIG. 5 is a voltage signal of the bootstrap capacitor Cbt.

In order to successfully turn on or off the high-side switch UG and prevent the high-side switch UG and other circuit components from being damaged, the charging circuit 20 detects the voltage of the bootstrap capacitor Cbt. For example, in the embodiment, when the current flowing through the high-side switch UG reaches the zero value, the charging circuit 20 detects the voltage of the bootstrap capacitor Cbt.

When the current flowing through the high-side switch UG is the zero value, the charging circuit 20 determines the time within which the bootstrap capacitor Cbt is detected and the frequency that the bootstrap capacitor Cbt is detected according to a clock signal CLK5.

The charging circuit 20 detects the voltage of the bootstrap capacitor Cbt to generate a capacitor voltage detected signal VBDS5 within a detection time included in a working period T51 of the clock signal CLK5 as shown in FIG. 5. The detection time is equal to or shorter than the working period T51 of the clock signal CLK5.

However, the charging circuit 20 does not detect and charge the bootstrap capacitor Cbt within a non-working period T52 of the clock signal CLK5 and other times, thereby reducing the power consumption of the power converter of the present disclosure.

When the current flowing through the high-side switch UG is the zero value, the charging circuit 20 may adjust the time within which the bootstrap capacitor Cbt is charged and the frequency that the bootstrap capacitor Cbt is charged according to the clock signal CLK5 and the detected voltage of the bootstrap capacitor Cbt (such as a voltage of the capacitor voltage detected signal VBDS5 as shown in FIG. 5).

For example, when the charging circuit 20 determines that the current time falls within the working period T51 of the clock signal CLK5 and the voltage of the bootstrap capacitor Cbt is lower than the reference voltage Vref, an enable signal PUMS5 of the charging circuit 20 is at a high level. When the enable signal PUMS5 is at the high level (within a working period of the waveform of the enable signal PUMS5), the charging circuit 20 charges the bootstrap capacitor Cbt.

The enable signal PUMS5 is maintained at a low level during a non-working period T52 of the clock signal CLK5. When the enable signal PUMS5 is at the low level (within a non-working period of the waveform of the enable signal PUMS5), the charging circuit 20 does not charge the bootstrap capacitor Cbt, thereby reducing the power consumption of the power converter of the present disclosure.

Figure 6:
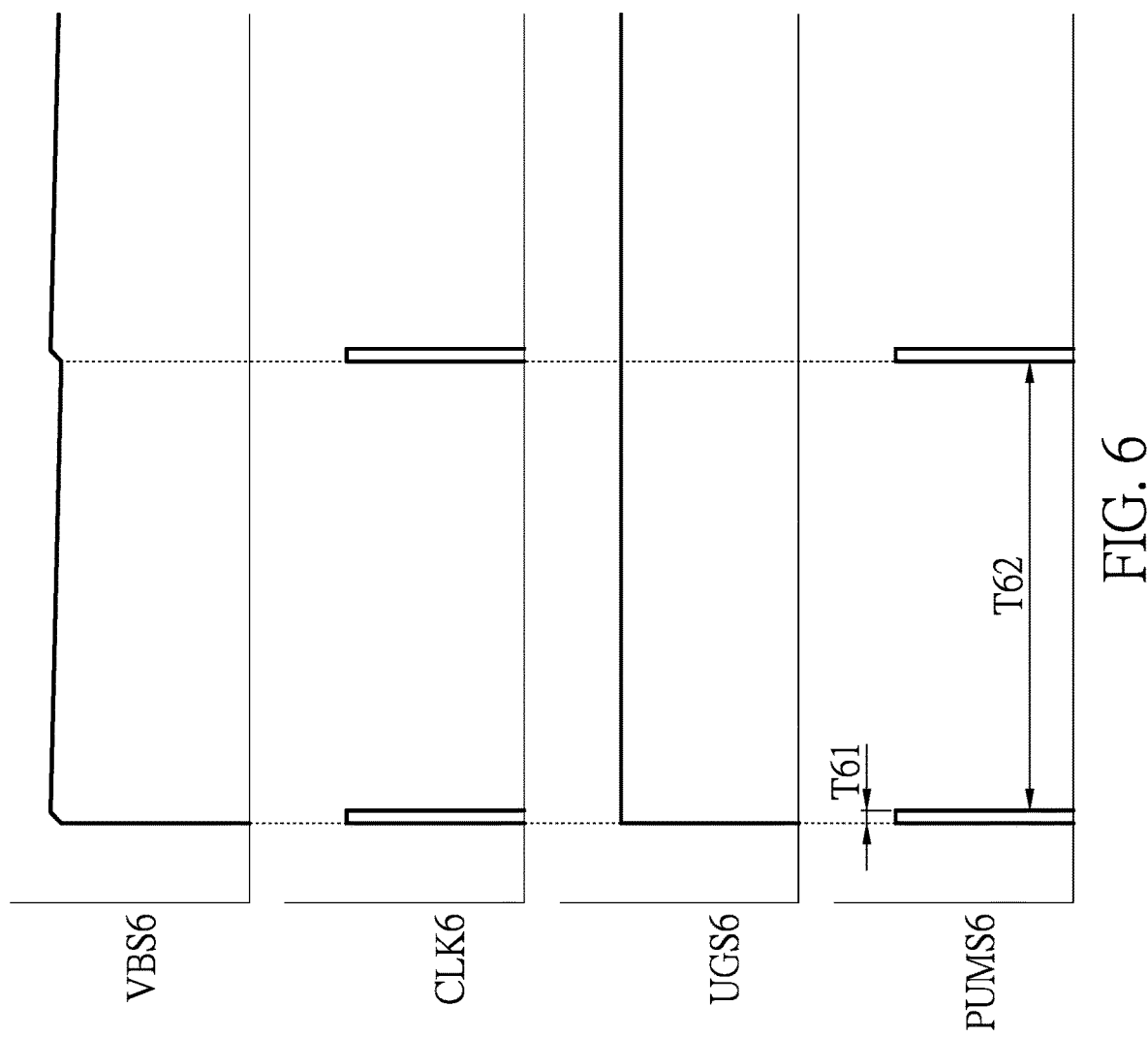
FIG. 6 is a waveform diagram of signals of the power converter having the high-side driving mechanism consuming the low power according to the fifth embodiment of the present disclosure.

Reference is made to FIGS. 1 and 6, in which FIG. 1 is a block diagram of a power converter having a high-side driving mechanism consuming low power according to first to fifth embodiments of the present disclosure, and FIG. 6 is a waveform diagram of signals of the power converter having the high-side driving mechanism consuming the low power according to the fifth embodiment of the present disclosure.

In order to successfully turn on or off the high-side switch UG and prevent the high-side switch UG and other circuit components from being damaged due to overvoltage, the charging circuit 20 detects the voltage of the bootstrap capacitor Cbt. For example, in the embodiment, when the high-side switch UG is continually turned on, the charging circuit 20 detects the voltage of the bootstrap capacitor Cbt.

As shown in FIG. 6, a working period of a waveform of a high-side conduction time signal UGS6 is 100% for continually turning on the high-side switch UG. Under this condition, the working period of the waveform of the high-side conduction time signal UGS6 is larger than a working period T61 of a clock signal CLK6, and a frequency of the high-side conduction time signal UGS6 is smaller than a frequency of the clock signal CLK6. At this time, a frequency of an enable signal PUMS6 of the charging circuit 20 is equal to the frequency of the clock signal CLK6, and a working period of the waveform of the enable signal PUMS6 is equal to the working period T61 of the clock signal CLK6.

The charging circuit 20 may determine the time within which the bootstrap capacitor Cbt is charged and the frequency that the bootstrap capacitor Cbt is charged according to the enable signal PUMS6. The charging circuit 20 charges the bootstrap capacitor Cbt within the working period T61 of the enable signal PUMS6. The charging circuit 20 does not charge the bootstrap capacitor Cbt within a non-working period T62 of the enable signal PUMS6. As a result, the high-side switch UG can be turned on or off normally by the charging circuit 20 of the power converter while the power consumption of the power converter of the present disclosure is reduced.

In other words, when the working period of the waveform of the high-side conduction time signal UGS6 is larger than the working period T61 of the clock signal CLK6, the charging circuit 20 determines the time within which the bootstrap capacitor Cbt is charged and the frequency that the bootstrap capacitor Cbt is charged according to the frequency and the working period T61 of the clock signal CLK6.

In conclusion, the present disclosure provides the power converter having the high-side driving mechanism consuming the low power. The charging circuit of the power converter of the present disclosure charges the bootstrap capacitor, and detects the data such as the voltage of the bootstrap capacitor. The charging circuit, according the detected data, determines whether or not the charging of the bootstrap capacitor is adjusted to charge the voltage of the bootstrap capacitor to reach the reference voltage. When the voltage of the bootstrap capacitor reaches the reference voltage, the high-side switch can be successfully turned on or off. At this time, the charging circuit stops charging the bootstrap capacitor, thereby reducing the power consumption of the power converter of the present disclosure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power converter having a high-side driving mechanism consuming low power, comprising:
   a high-side switch, wherein a first terminal of the high-side switch is coupled to an input voltage;
   a low-side switch, wherein a first terminal of the low-side switch is connected to a second terminal of the high-side switch, and a second terminal of the low-side switch is grounded;
   a control circuit connected to a control terminal of the high-side switch and a control terminal of the low-side switch, and configured to control the high-side switch and the low-side switch to operate;
   a bootstrap circuit including a bootstrap capacitor, wherein a first terminal of the bootstrap capacitor is connected to a node between the first terminal of the low-side switch and the second terminal of the high-side switch; and
   a charging circuit connected to a second terminal of the bootstrap capacitor, wherein the charging circuit charges the bootstrap capacitor, the charging circuit detects data of the bootstrap capacitor to determine whether or not to stop charging the bootstrap capacitor or to adjust charging of the bootstrap capacitor;
   wherein the charging circuit is configured to charge the bootstrap capacitor until when a voltage of the bootstrap capacitor reaches a reference voltage so that the high-side switch is successfully turned on;
   wherein, when the charging circuit determines that the voltage of the bootstrap capacitor reaches the reference voltage according to the data of the bootstrap capacitor, the charging circuit stops charging the bootstrap capacitor.

2. The power converter according to claim 1, wherein the charging circuit detects the bootstrap capacitor within a detection time included in a working period of each pulse wave of a clock signal, but the charging circuit does not detect the bootstrap capacitor within other time periods of each of the pulse waves of the clock signal.

3. The power converter according to claim 1, wherein, when the charging circuit determines that the voltage of the bootstrap capacitor is higher than the reference voltage, the charging circuit stops charging the bootstrap capacitor.

4. The power converter according to claim 1, wherein the charging circuit charges the bootstrap capacitor within working periods of pulse waves of a clock signal, and the charging circuit does not charge the bootstrap capacitor within non-working periods of the pulse waves of the clock signal.

5. The power converter according to claim 1, wherein, when the charging circuit determines that a current time falls within a working period of a pulse wave of a clock signal and the voltage of the bootstrap capacitor is lower than the reference voltage, the charging circuit charges the bootstrap capacitor.

6. The power converter according to claim 5, wherein, when the charging circuit determines that the current time falls within the working period of the pulse wave of the clock signal and the voltage of the bootstrap capacitor is higher than the reference voltage, the charging circuit stops charging the bootstrap capacitor.

7. The power converter according to claim 6, wherein, when the charging circuit determines that the current time does not fall within the working period of the pulse wave of the clock signal, the charging circuit does not detect or charge the bootstrap capacitor.

8. The power converter according to claim 1, wherein the control circuit turns on the high-side switch within a working period of a waveform of a high-side conduction time signal, and the control circuit turns off the high-side switch within a non-working period of the waveform of the high-side conduction time signal.

9. The power converter according to claim 8, wherein, when a frequency of the high-side conduction time signal is larger than a frequency of a clock signal, the charging circuit determines a frequency that the charging circuit charges the bootstrap capacitor according to the frequency of the high-side conduction time signal.

10. The power converter according to claim 9, wherein, when the frequency of the high-side conduction time signal is smaller than the frequency of the clock signal, the charging circuit determines the frequency that the charging circuit charges the bootstrap capacitor according to the frequency of the clock signal.

11. The power converter according to claim 9, wherein, when the working period of the waveform of the high-side conduction time signal is larger than a working period of the pulse wave of the clock signal, the charging circuit determines time within which the charging circuit charges the bootstrap capacitor according to the working period of the waveform of the clock signal.

12. The power converter according to claim 8, wherein, when the working period of the waveform of the high-side conduction time signal is smaller than a working period of a pulse wave of a clock signal, the charging circuit determines a charging time within which the charging circuit charges the bootstrap capacitor according to the working period of the waveform of the high-side conduction time signal.

13. The power converter according to claim 1, wherein, when a current flowing through the high-side switch reaches a zero value, the charging circuit determines time within which the bootstrap capacitor is detected and a frequency that the bootstrap capacitor is detected according to working periods of pulse waves of a clock signal.

14. The power converter according to claim 1, wherein, when a current flowing through the high-side switch reaches a zero value, the charging circuit determines time within which the bootstrap capacitor is charged and a frequency that the bootstrap capacitor is charged according to a clock signal and the voltage of the bootstrap capacitor being detected by the charging circuit.

15. The power converter according to claim 1, further comprising:
   a first inverter, wherein an input terminal of the first inverter is connected to an output terminal of the control circuit, and an output terminal of the first inverter is connected to the control terminal of the high-side switch.

16. The power converter according to claim 15, wherein a power terminal of the first inverter is connected to the charging circuit.

17. The power converter according to claim 15, further comprising:
a second inverter, wherein an input terminal of the second inverter is connected to the output terminal of the control circuit, and an output terminal of the second inverter is connected to the control terminal of the low-side switch.

18. A power converter having a high-side driving mechanism consuming low power, comprising:
a high-side switch, wherein a first terminal of the high-side switch is coupled to an input voltage;
a low-side switch, wherein a first terminal of the low-side switch is connected to a second terminal of the high-side switch, and a second terminal of the low-side switch is grounded;
a control circuit connected to a control terminal of the high-side switch and a control terminal of the low-side switch, and configured to control the high-side switch and the low-side switch to operate;
a bootstrap circuit including a bootstrap capacitor, wherein a first terminal of the bootstrap capacitor is connected to a node between the first terminal of the low-side switch and the second terminal of the high-side switch; and
a charging circuit connected to a second terminal of the bootstrap capacitor, wherein the charging circuit charges the bootstrap capacitor, and the charging circuit detects data of the bootstrap capacitor to determine whether or not to stop charging the bootstrap capacitor or to adjust charging of the bootstrap capacitor;
wherein the charging circuit detects the bootstrap capacitor within a detection time included in a working period of each pulse wave of a clock signal, but the charging circuit does not detect the bootstrap capacitor within other time periods of each of the pulse waves of the clock signal.

* * * * *